United States Patent Office 3,646,225
Patented Feb. 29, 1972

3,646,225
TREATMENT OF PENTACHLOROPHENOL
Jack A. Morrison, Calgary, Alberta, Canada, assignor to The Dow Chemical Company, Midland, Mich.
No Drawing. Filed July 24, 1967, Ser. No. 657,465
Int. Cl. C07c *39/24*
U.S. Cl. 260—623 R      3 Claims

ABSTRACT OF THE DISCLOSURE

Granular pentachlorophenol such as that used for preserving wood slowly sublimes during storage to form a finely crystalline dust which is highly irritating to skin and mucous membranes and which adversely affects the appearance of the product. Such sublimation and vaporization of residual acid from the product are essentially avoided by adding to the molten pentachlorophenol prior to the granulating step a small amount of an amine of low volatility. Alkanolamines such as diethanolamine and triethanolamine are particularly suitable for the purpose.

BACKGROUND OF THE INVENTION

This invention relates to an improved process for making granular or flaked pentachlorophenol and to the granular pentachlorophenol thereby produced.

Pentachlorophenol is a commonly used biocide which is extensively applied to the preservation of wood against microbial attack. It is ordinarily transported and sold as flakes, beads, or otherwise granulated solid of crude, technical, or relatively pure quality depending upon the end use. Any such branulated pentachlorophenol is prone to sublime slowly during storage, forming a bloom of finely crystalline dust on the solid granules and on the inside surface of the container. This sublimate not only affects the appearance of the material itself and the container in which it is stored, but it is also readily dispersed in the air when the container is opened to make a fog of fine dust which is intensely irritating to the skin and mucuous membranes. Traces of residual hydrogen chloride in crude and technical grades of pentachlorophenol may aggravate the problem and the acid also contributes to deterioration of the container.

A light spray of a petroleum oil has been used to wet the surface of granular pentachlorophenol. This treatment has some beneficial effect, but it is not completely effective to prevent sublimation and the presence of the oil may be disadvantageous in some cases. For example, the oil treatment makes the solid appear to be a darker color and it may cause staining or deterioration of the container.

Molten pentachlorophenol can be blown with air to reduce fumes of residual acid or other volatile materials from the solidified material. However, this treatment is likely to increase substantially the formation of undesirable insoluble sludges upon dissolution of the product in a solvent for application to lumber, wood posts and other such articles.

SUMMARY OF THE INVENTION

It has now been found that irritating dusts and vapors are substantially avoided and the appearance of the solid material is essentially unaffected when there is incorporated in granular pentachlorophenol about 100–10,000 parts per million by weight of an amine of low volatility, i.e., having a boiling point of at least about 160° C. A process for making granular solid pentachlorophenol comprises cooling the molten material in the course of a flaking or other granulating operation, and the benefits of the present invention are obtained by incorporating the amine in the molten pentachlorophenol to make a substantially uniform mixture. Preferably, about 500–2000 parts per million of amine is employed.

Any amine sufficiently basic to form a stable hydrohalide salt and having a boiling point of at least about 160° C. can be used in the present invention. Since technical pentachlorophenol melts at about 160–170° C., preferred amines are those having a boiling point of at least 200° C. to minimize loss by vaporization, particularly when the amine is added to the molten material. Amines thereby included are aliphatic, cycloaliphatic, heterocyclic, and aromatic amines having the above properties.

Particularly preferred amines are lower alkanolamines or any mixture consisting essentially of such amines. By the term lower alkanolamines is meant secondary and tertiary hydroxyalkylamines wherein the alkyl groups are of 2–3 carbon atoms. Representative compounds are diethanolamine, diisopropanolamine, triethanolamine, aminoethylethanolamine, and the like. Mixtures such as still bottoms from the distillation of an ammoniaethylene oxide reaction product are suitable.

DETAILED DESCRIPTION

The process of this invention provides pentachlorophenol as a dry solid not perceptibly darkened in color and with a minimal tendency to produce fogs and fumes of sublimed dust and residual hydrogen chloride. The process causes only a slight increase in oil-insoluble sludge content of the treated pentachlorophenol and the product remains fully suitable for wood preservation and other biocidal applications. If desired, additional benefits are obtained in some cases by treating the product of this invention with oil.

Amines other than the preferred class of alkanolamines described above which give good results as amine additives in the present process include alkylamines of 8–40 carbon atoms such as octylamine, diamylamine, trihexylamine, dilaurylamine, and trioctylamine; aralkylamines such as benzylamine and phenylethylamine; alkylenepolyamines of 4–12 carbon atoms such as diethylenetriamine, triethylenetetramine, and diethylaminopropylamine; cycloaliphatic amines such as dicyclohexylamine and dicyclopentylamine; and heterocyclic amines such as quinoline, tetrahydroquinoline, ethylpyridine, tetramethylpiperazine, phenylmorpholine, morpholineethanol, and the like.

Aromatic amines such as aniline, toluidine, and xylidine can also be used.

In order to obtain the full benefit of the present invention, the amine additive is incorporated and dispersed in the molten pentachlorophenol before granulation of flaking. Application of amine as a surface spray to the solid material is only partially effective.

The following examples illustrate applications of the process to a technical grade of pentachlorophenol such as that typically used to preserve wood posts, utility poles, and the like.

EXAMPLES 1–5

A number of batches of technical grade pentachlorophenol were flaked. In each case, part of the molten material was run through the flaking operation without further treatment while to the rest there was added to the molten pentachlorophenol prior to flaking parts per million by weight of ethanolamine still bottoms as indicated. These still bottoms were the residue remaining after distillation of ethanolamine and diethanolamine from the reaction product of ammonia and ethylene oxide. The major component was triethanolamine. Flaked treated and untreated material was checked visually for blooming after storage at ambient temperature in polyethylene bags for several days.

| P.p.m.: | Blooming | |
|---|---|---|
| | Untreated | Treated |
| 300 | Considerable | Some. |
| 750 | do | Little. |
| 1,250 | do | Essentially none. |
| 2,500 | do | Do. |
| 5,000 | do | Do. |

Similar results are obtained when pure triethanolamine or diethanolamine is substituted for the still bottoms used in the above examples. Diethanolamine, in particular, was found to give results at least as good as those of Examples 1–5 when used as shown. In the same way, diisopropanolamine, triisopropanolamine, or corresponding still bottoms are used in the amounts and manner described to obtain comparable results. Similar results are obtained when amines of other classes as defined above are employed as the amine additive in the same way.

I claim:
1. Pentachlorophenol containing 100–10,000 parts per million by weight of an amine wherein said amine is a lower alkanolamine which is a secondary or tertiary hydroxyalkylamine wherein alkyl is of 2–3 carbon atoms.
2. Pentachlorophenol as defined in claim 1 wherein the alkanolamine consists essentially of triethanolamine.
3. Pentachlorophenol as defined in claim 1 wherein the alkanolamine is diethanolamine.

References Cited
UNITED STATES PATENTS

| 1,919,298 | 7/1933 | Lehmann et al. | 260—567.5 X |
| 2,435,676 | 2/1948 | Fitzgerald et al. | 167—45 |
| 2,780,546 | 2/1957 | Moyle et al. | 260—567.5 X |
| 2,993,934 | 7/1961 | Rosen | 260—567.5 X |

ROBERT V. HINES, Primary Examiner

U.S. Cl. X.R.

252—403; 260—247, 247.7 A, 268 R, 283, 290, 563 R, 570.8 R, 570.9, 578, 583 PR, 584 BR